US009807340B2

(12) United States Patent
Hwang et al.

(10) Patent No.: US 9,807,340 B2
(45) Date of Patent: Oct. 31, 2017

(54) METHOD AND APPARATUS FOR PROVIDING EYE-CONTACT FUNCTION TO MULTIPLE POINTS OF ATTENDANCE USING STEREO IMAGE IN VIDEO CONFERENCE SYSTEM

(71) Applicant: Electronics and Telecommunications Research Institute, Daejeon (KR)

(72) Inventors: In Ki Hwang, Daejeon (KR); Mi Suk Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 217 days.

(21) Appl. No.: 14/951,005

(22) Filed: Nov. 24, 2015

(65) Prior Publication Data

US 2016/0150182 A1    May 26, 2016

(30) Foreign Application Priority Data

Nov. 25, 2014   (KR) .......................... 10-2014-0165594
Oct. 19, 2015   (KR) .......................... 10-2015-0145169

(51) Int. Cl.
| | |
|---|---|
| *G06K 9/00* | (2006.01) |
| *H04N 7/14* | (2006.01) |
| *H04N 13/00* | (2006.01) |
| *H04N 13/02* | (2006.01) |
| *H04N 13/04* | (2006.01) |

(52) U.S. Cl.
CPC ......... *H04N 7/144* (2013.01); *H04N 13/0011* (2013.01); *H04N 13/0022* (2013.01); *H04N 13/0239* (2013.01); *H04N 13/0271* (2013.01); *H04N 13/0484* (2013.01)

(58) Field of Classification Search
None
See application file for complete search history.

(56) References Cited

U.S. PATENT DOCUMENTS

| 9,536,155 B2* | 1/2017 | Takemae ................... B60R 1/00 |
| 2009/0129667 A1* | 5/2009 | Ho ........................ G06T 15/205 |
| | | 382/154 |
| 2011/0050864 A1* | 3/2011 | Bond ..................... H04N 13/026 |
| | | 348/51 |
| 2013/0069939 A1 | 3/2013 | Sung |
| 2014/0257532 A1 | 9/2014 | Kim et al. |
| 2015/0370349 A1* | 12/2015 | Bailey ................... G06F 3/0346 |
| | | 345/158 |
| 2016/0065930 A1* | 3/2016 | Chandra ............ H04N 13/0007 |
| | | 348/46 |
| 2017/0188002 A1* | 6/2017 | Chan .................. H04N 13/0018 |

FOREIGN PATENT DOCUMENTS

| KR | 1019990070445 A | 9/1999 |
| KR | 1020100019927 A | 2/2010 |
| KR | 1020120093751 A | 8/2012 |

* cited by examiner

*Primary Examiner* — Iman K Kholdebarin
(74) *Attorney, Agent, or Firm* — William Park & Associates Ltd.

(57) ABSTRACT

The present invention relates to a new eye-contact function providing method which provides a natural eye-contact function to attendances by using a stereo image and a depth image to estimate a precise depth value of the occlusion region and improve a quality of a composite eye-contact image when there are two or more remote attendances in one site at the time of a video conference using a video conference system and an apparatus therefor.

14 Claims, 10 Drawing Sheets

METHOD AND APPARATUS FOR PROVIDING EYE-CONTACT FUNCTION TO MULTIPLE POINTS OF ATTENDANCE USING STEREO IMAGE IN VIDEO CONFERENCE SYSTEM

CROSS-REFERENCE TO RELATED APPLICATIONS

This application claims priority to and the benefit of Korean Patent Application Nos. 10-2014-0165594 and 10-2015-0145169 filed in the Korean Intellectual Property Office on Nov. 25, 2014 and Oct. 19, 2015, respectively, the entire contents of which are incorporated herein by reference.

TECHNICAL FIELD

The present invention relates to an eye-contact function providing method for a telepresence/video conference and an apparatus therefor, and particularly, to an eye-contact function providing method which improves a quality of eye-contact images between remote attendances during a video conference using a video conference system and an apparatus therefor.

BACKGROUND ART

As a method for providing an eye-contact function on a video conference system, there are mainly a physical method and an image composing method. Between the methods, the image composite method estimates a depth value from an image which is two-dimensionally obtained to project the image into a three-dimensional space and projects the projected image to a two-dimensional space in which the projected image is displayed again. A technique which becomes a basis of the image composing method is a method which estimates a depth value from the two-dimensional image and according to the related art, a technique which performs stereo-matching using two cameras or uses two image cameras and one depth camera to estimate a depth value is used.

Figure 1:
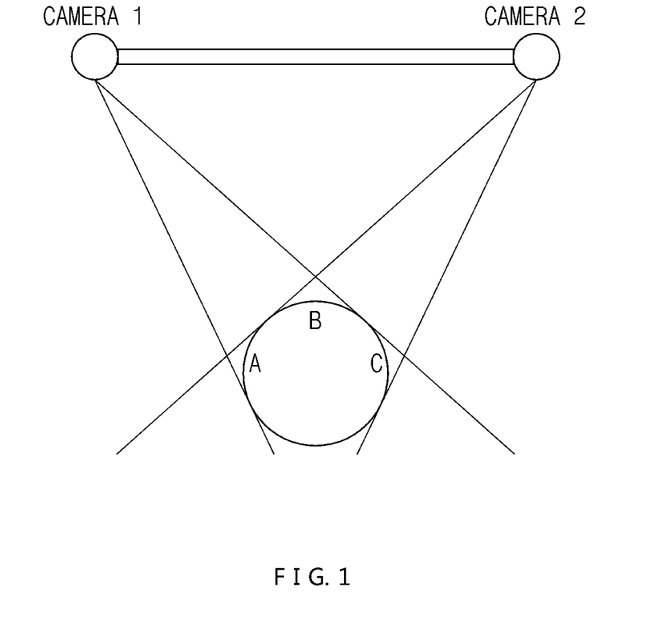
FIG. 1 is a view explaining an occlusion area in accordance with a disparity of a stereo camera in an image matching method of the related art using a stereo camera.
Figure 2:
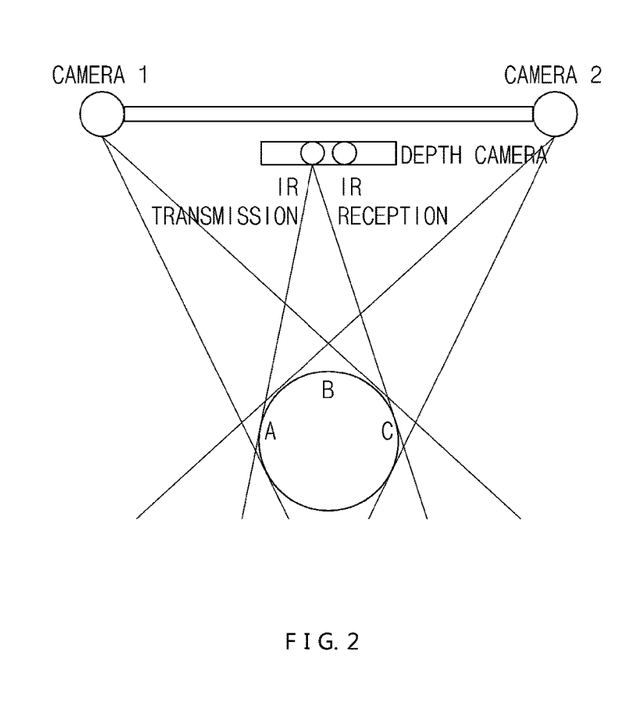
FIG. 2 is a view explaining an image matching method of the related art using a stereo camera and a depth camera.

As illustrated in FIG. 1, the stereo matching method is a method which uses a color image input in a stereo camera which is configured by two cameras to warp a specific reference point (pixel) of one image to another image to find a point (pixel) having the most similarity and a warping equation is obtained using inherent parameter values of two cameras. As illustrated in FIG. 2, a method using a depth camera uses a depth value as a reference value in order to perform the stereo matching, thereby improving precision of the depth.

According to a method using the stereo-matching of the related art, there is an occlusion region in an input image of a stereo camera in accordance with a view point and thus, a desired result for the occlusion region cannot be obtained when using the stereo-matching method. For example, as illustrated in FIG. 1, images which are input when a camera 1 photographs a subject are areas A and B and images which are input when a camera 2 photographs the same subject are areas B and C. In this case, the areas A and C except for the area B are occlusion regions which are not photographed by the camera 1 or the camera 2.

SUMMARY OF THE INVENTION

The present invention has been made in an effort to provide a new eye-contact function providing method which provides a natural eye-contact function to attendances using a stereo image and a depth image to estimate a precise depth value of the occlusion region and improve a quality of a composite eye-contact image when there are two or more remote attendances in one site at the time of a video conference using a video conference system and an apparatus therefor.

Technical objects of the present invention are not limited to the aforementioned technical objects and other technical objects which are not mentioned will be apparently appreciated by those skilled in the art from the following description.

First, in summary of a feature of the present invention, an exemplary embodiment of the present invention provides an image processing method in an image processing apparatus which supports a video conference including: generating an object mask for an image using stereo image information from a first camera and a second camera and depth image information from a depth camera and calculating an occlusion region in the object mask with respect to a depth; calculating an edge coordinate between objects of the image using the object mask and the occlusion region and determining a depth value of the edge coordinate of the depth image information through stereo image matching using the depth image information; and correcting such that there are depth values of the occlusion region to an end of the occlusion region toward the occlusion region in the edge coordinate.

The image processing method may be performed for eye-contact processing between a remote attendance and a local attendance in a video conference system.

In the calculating of an occlusion region, an object part for each of the stereo images may be extracted and an object part region for an image of the first camera at the left and the second camera at the right may be generated as the object mask depending on whether a rear side object is positioned at a left or right in the image.

In the calculating of an occlusion region, the depth image information may be warped to an image plane to perform an exclusive OR for the effective region of the warped depth value and the object mask, thereby calculating the occlusion region.

The edge coordinate may be an edge between a front object and a rear object and may be coordinates of pixels of the front object before the start of the occlusion region.

In the correcting, depth values for the occlusion region may be corrected by a predetermined value for every pixel unit in accordance with pixel proximity.

After the correcting, the method may further include generating a three-dimensional image having depth values for the occlusion region to convert a view point such that an eye part of a person among objects of the image is contacted, thereby providing a corrected image.

Another exemplary embodiment of the present invention provides, an image processing apparatus which supports a video conference, including: an occlusion region calculating unit which generates an object mask for an image using stereo image information from a first camera and a second camera and depth image information from a depth camera and calculates an occlusion region in the object mask with respect to a depth; a stereo matching unit which calculates an edge coordinate between objects of the image using the object mask and the occlusion region and determines a depth value of the edge coordinate of the depth image information through stereo image matching using the depth image information; and a spread correcting unit which corrects such that there are depth values of the occlusion region to an end of the occlusion region toward the occlusion region in the edge coordinate.

The image processing apparatus may be for eye-contact processing between a remote attendance and a local attendance in a video conference system.

The occlusion region calculating unit may extract an object part for each of the stereo images and generate an object part region for an image of the first camera at the left and the second camera at the right as the object mask depending on whether a rear side object is positioned at a left or right in the image.

The occlusion region calculating unit may warp the depth image information to an image plane to perform an exclusive OR for the effective region of the warped depth value and the object mask, thereby calculating the occlusion region.

The stereo matching unit may calculate coordinates of pixels of the front object before the start of the occlusion region as the edge coordinate, as an edge between a front object and a rear object.

The spread correcting unit may correct depth values for the occlusion region by a predetermined value for every pixel unit in accordance with pixel proximity.

The spread correcting unit may generate a three-dimensional image having depth values for the occlusion region to convert a view point such that an eye part of a person among objects of the image is contacted, thereby providing a corrected image.

According to the eye-contact function providing method in a video conference system and the apparatus therefor of the present invention, on a video conference system in which two or more remote attendances participate at one site, a precise depth value for an occlusion region is estimated using a stereo image and a depth image to provide a composite eye-contact image to provide a more natural eye-contact function, thereby improving a quality of a video conference.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some embodiments of the present invention will be described in detail with reference to the accompanying drawings. In the figures, even though the like parts are illustrated in different drawings, it should be understood that like reference numerals refer to the same parts of the present invention. In describing the embodiments of the present invention, when it is determined that the detailed description of the known configuration or function related to the present invention may obscure the understanding of embodiments of the present invention, the detailed description thereof will be omitted.

In describing components of the exemplary embodiment of the present invention, terminologies such as first, second, A, B, (a), (b), and the like may be used. However, such terminologies are used only to distinguish a component from another component but nature or an order of the component is not limited by the terminologies. If it is not contrarily defined, all terms used herein including technological or scientific terms have the same meaning as those generally understood by a person with ordinary skill in the art. Terminologies which are defined in a generally used dictionary should be interpreted to have the same meaning as the meaning in the context of the related art but are not interpreted as an ideally or excessively formal meaning if they are not clearly defined in the present invention.

First, in an eye-contact function providing method in a video conference system of the present invention, a depth camera is used in addition to a stereo camera, so that a depth value of a subject in front (or below the front) of the subject is obtained using the depth camera and is used as a weight when a stereo image obtained using the stereo camera is matched. Therefore, an occlusion region of left and right cameras is reduced and a precise depth value for the occlusion region is estimated to increase precision of an eye-contact image result.

Figure 3:
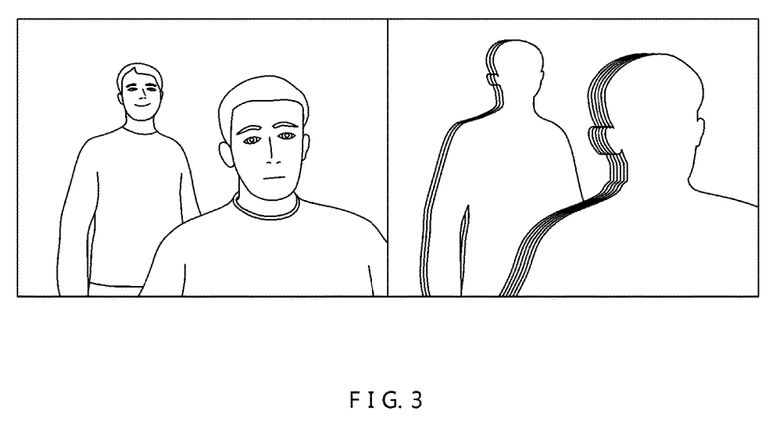
FIG. 3 is a view explaining a depth image obtained from the depth camera of FIG. 2.

In order to obtain the depth value, the depth camera transmits and receives infrared ray (IR) and time of flight (ToF) method using a time difference is used. In this case, a precise depth value is not reflected to an occlusion region (a region where a transmitted IR is not received) for a depth which the IR does not reach as a result of composing the images, so that the occlusion region is represented by black as illustrated in FIG. 3. When there is one attendance of a video conference which is displayed on one screen, the occlusion region is generated at a side of an entity of a person, so that there is no big problem to obtain a depth value of the entity. However, when there are two or more attendance of the video conference which are displayed on one screen, an occlusion region of one attendance with respect to a depth may block a face of other attendance behind the attendance.

According to the present invention, on a video conference system in which two or more remote attendances participate at one site, a precise depth value for an occlusion region for a depth is estimated using a stereo image and a depth image to provide a composite eye-contact image to provide a more natural eye-contact function, thereby improving a quality of a video conference.

Figure 4:
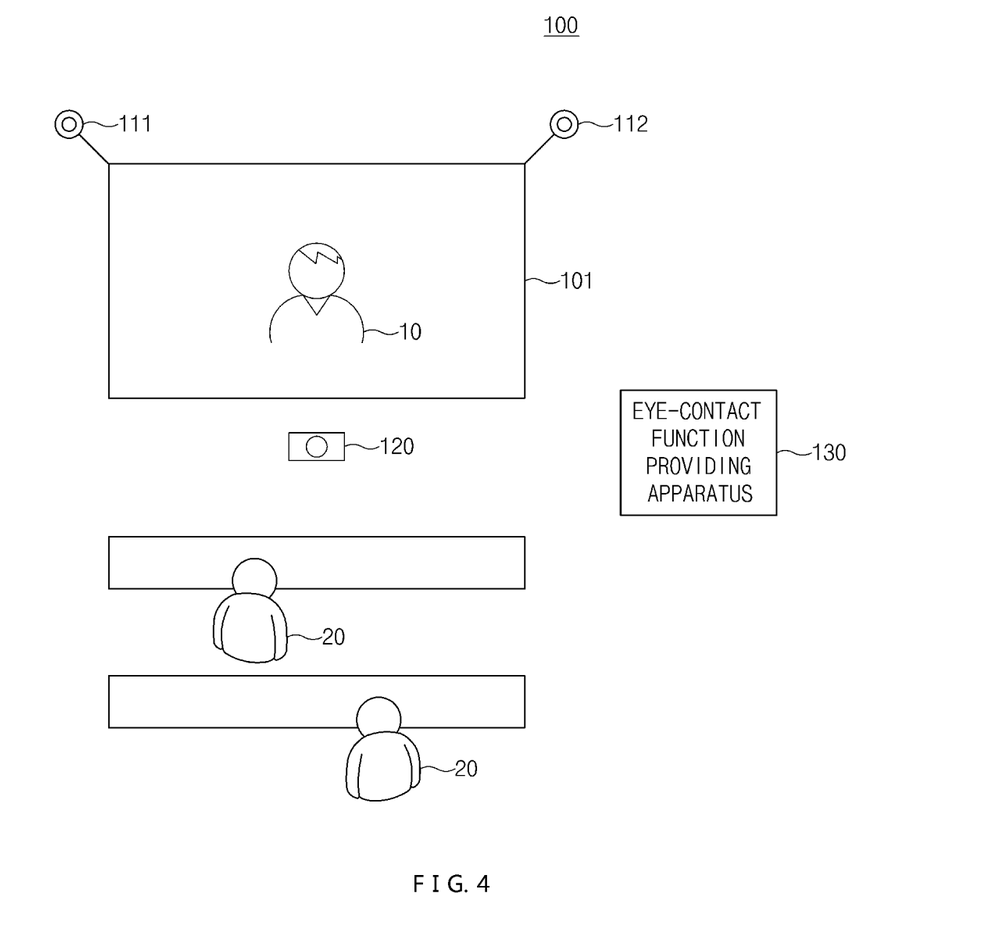
FIG. 4 is a view explaining a video conference system according to an exemplary embodiment of the present invention.

FIG. 4 is a view explaining a video conference system 100 according to an exemplary embodiment of the present invention.

Referring to FIG. 4, a video conference system 100 according to an exemplary embodiment of the present invention includes stereo cameras which are provided at both sides of a screen 101, that is, a left camera 111 and a right camera 112 and a depth camera 120 provided at a center below the screen 101. Further, the video conference system 100 includes an eye-contact function providing apparatus 130 which provides an eye-contact function using a stereo image and a depth image as an image processing apparatus which supports the video conference.

Here, even though positions where the left camera 111, the right camera 112, and the depth camera 120 are provided are illustrated in FIG. 4, the positions are not limited thereto and the left camera 111, the right camera 112, and the depth camera 120 may be provided in appropriate positions where an image is photographed by appropriately reflecting a conference site such as a face or a body of a local attendance (s) 20 in order to appropriately transmit the photographed image to the video conference system of a remote attendance 10 in accordance with a predetermined conference purpose.

The stereo cameras 111 and 112 photograph images toward the local attendance(s) 20 during the video conference to obtain a color image (stereo image information) of each pixel for a subject such as the local attendance(s) 20 and the depth camera 120 includes an infrared (IR) transceiving module to transmit and receive infrared ray (IR) to and from the local attendance(s) 20 and obtains a depth value (depth image information) of each pixel for the subject such as the local attendance(s) 20 by a ToF method using a transceiving time difference of the infrared (IR).

Figure 5:
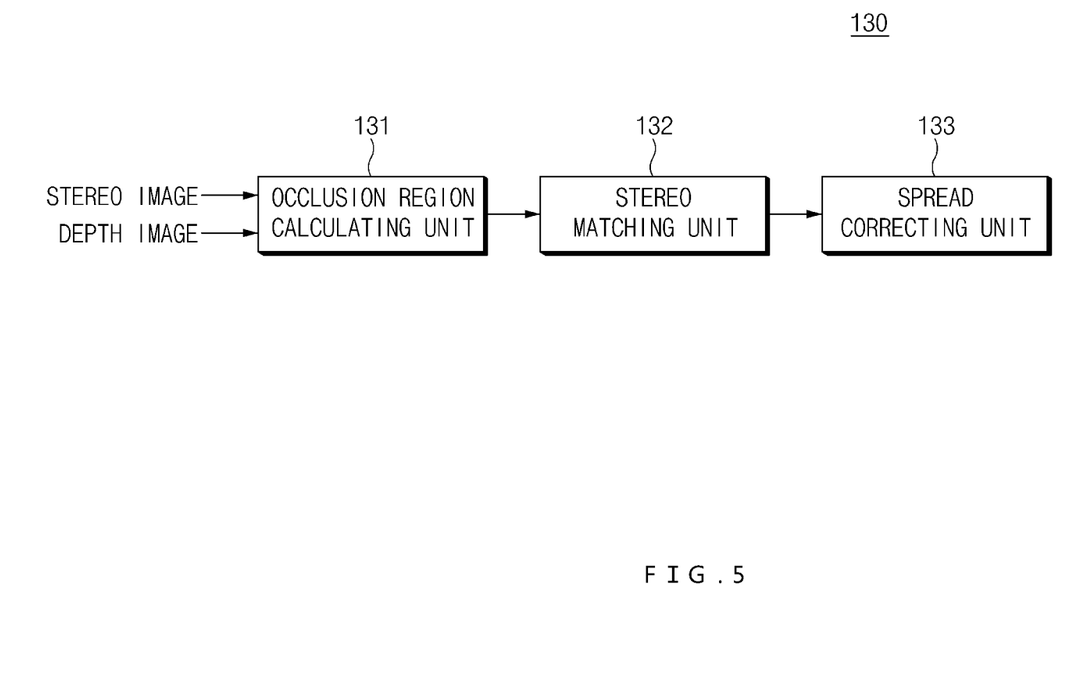
FIG. 5 is a diagram explaining an eye-contact function providing apparatus according to an exemplary embodiment of the present invention.

FIG. 5 is a diagram explaining an eye-contact function providing apparatus 100 according to an exemplary embodiment of the present invention.

Referring to FIG. 5, the eye-contact function providing apparatus 130 according to an exemplary embodiment of the present invention which supports the video conference to provide an eye-contact function using the stereo image from the stereo cameras 111 and 112 and the depth image from the depth camera 120 includes an occlusion region calculating unit 131, a stereo matching unit 132, and a spread correcting unit 133. In addition, even though not illustrated, the eye-contact function providing apparatus 100 may further include a transmitting unit which transmits an image (information) corrected in the spread correcting unit 133, that is, telepresence data to a video conference system of a remote attendance 10 or a display device which processes telepresence data received from the video conference system of the remote attendance 10 to display the remote attendance 10 on a screen as illustrated in FIG. 4.

Constitutional elements of the eye-contact function providing apparatus 100 according to an exemplary embodiment of the present invention may be implemented by hardware, software, or a combination thereof. For example, a predetermined application program stored in a predetermined memory is executed to provide a setting or data required for each constitutional element of the eye-contact function providing apparatus 10 required to provide the eye-contact function of the present invention. Further, all or some of the constitutional elements of the eye-contact function providing apparatus 100 may be implemented by one processor.

An operation of the eye-contact function providing apparatus 100 according to the exemplary embodiment of the present invention as described above will be described with reference to a flowchart in FIG. 6.

Figure 6:
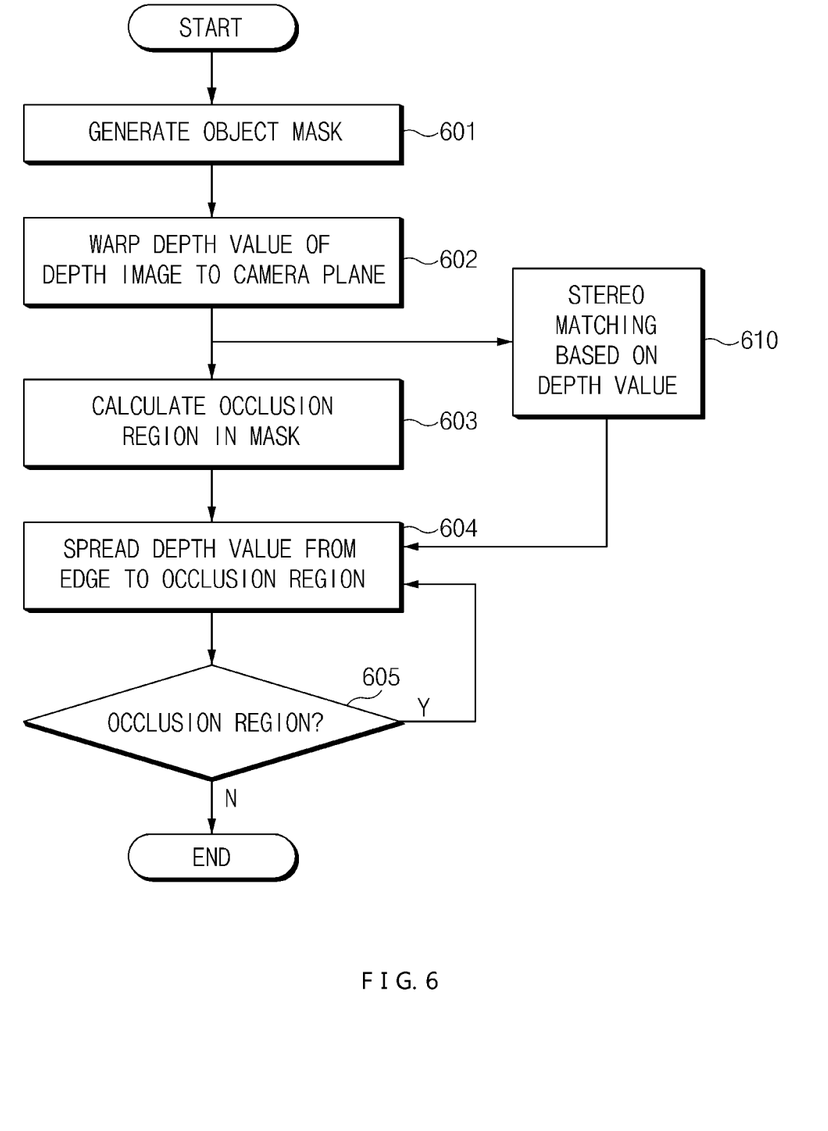
FIG. 6 is a flowchart explaining an operating of an eye-contact function providing apparatus according to an exemplary embodiment of the present invention.

FIG. 6 is a flowchart explaining an operating of an eye contact function providing apparatus 130 according to an exemplary embodiment of the present invention.

The occlusion region calculating unit 131 generates an object mask 39 of the image using the stereo image information from the stereo cameras 111 and 112 and the depth image information from the depth camera 120 in 601 and calculates an occlusion region in the object mask 39 with respect to a depth in 602 and 603.

Figure 7:
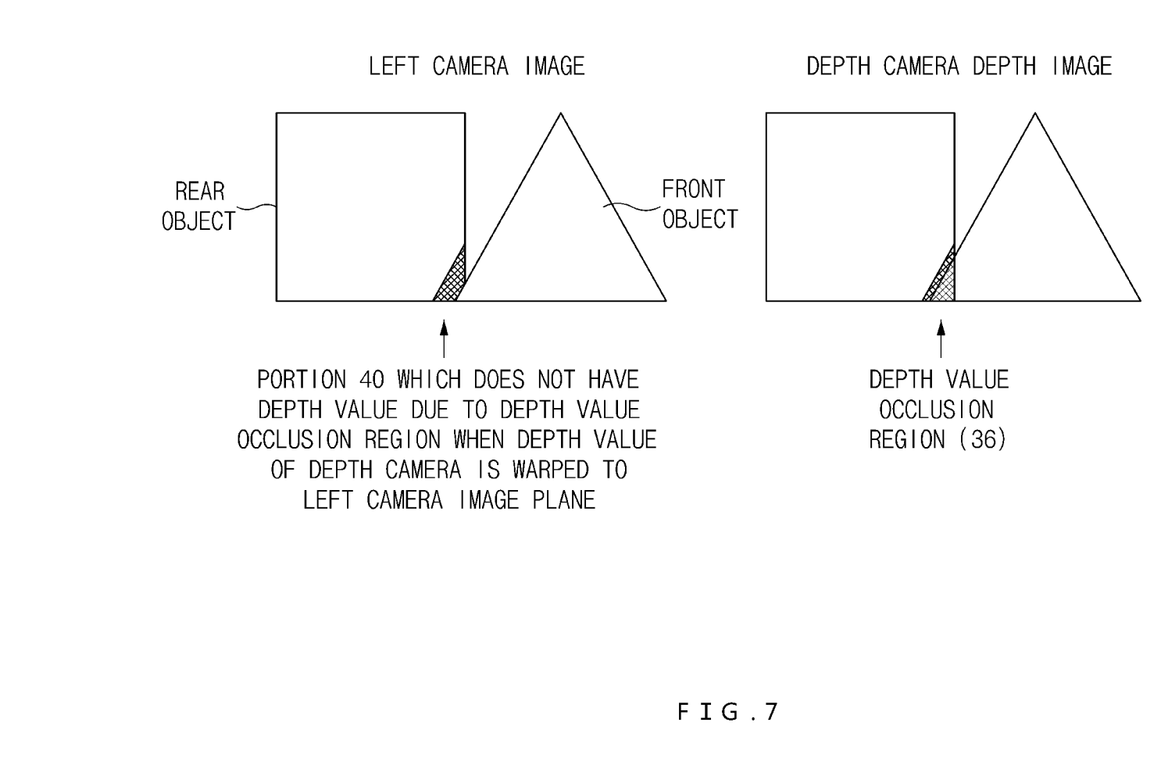
FIG. 7 is a view explaining an image obtained by a left image camera of FIG. 4 and an image obtained by a depth camera of FIG. 4.
Figure 8:
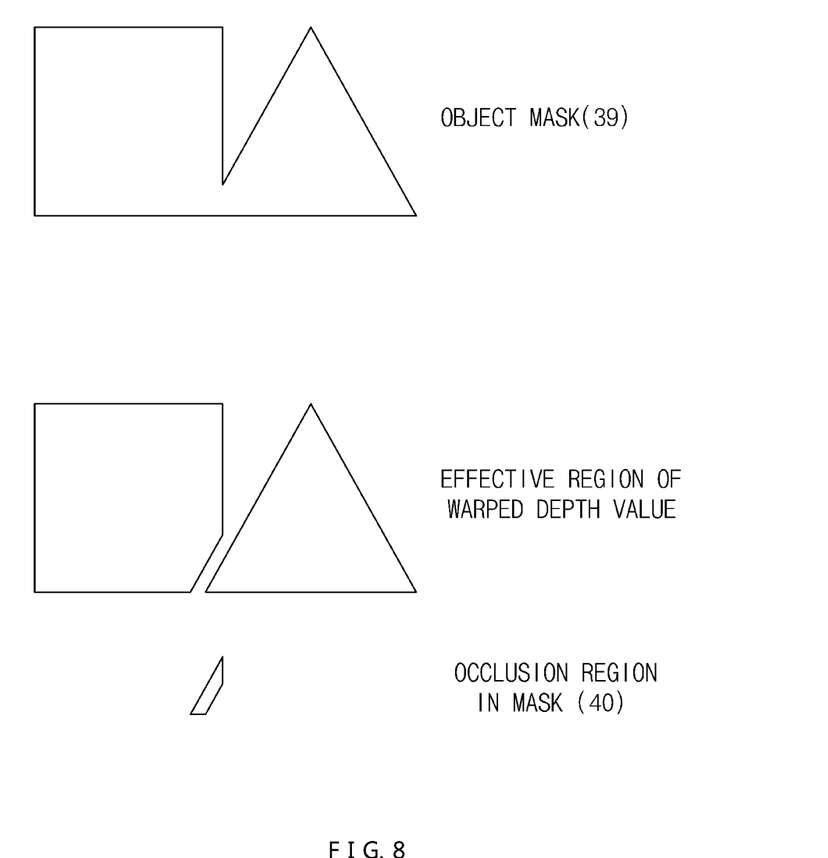
FIG. 8 is a view explaining an object mask, depth camera warping, and an occlusion region according to an exemplary embodiment of the present invention.

First, for example, the occlusion region calculating unit 131 separates an object part and a background part from the stereo image using a predetermined object extracting algorithm and generates coordinate values (pixels) of the object part region for an image of the corresponding camera (for example, the left camera 111 in an example of FIG. 7), that is, an object mask 39 illustrated in FIG. 8 depending on whether a rear side object is positioned at a left or a right of a front side object in the image in 601.

The occlusion region calculating unit 131 warps (for example, modifies to achieve image matching, such as enlarges or reduces) the depth image information, that is, a depth value of each pixel to an image plane of the corresponding camera (for example, the left camera 111 in the example of FIG. 7) to calculate an effective region (pixels) of the depth value warped as illustrated in FIG. 8 in 602 and then calculates the occlusion region 40 in the object mask 39 as illustrated in FIG. 8 through an exclusive OR for the object mask 39 and the effective region in 603. The effective region (pixels) of the depth value may be a portion where the depth value is equal to or larger than a predetermined value and the occlusion region in the object mask 39 corresponds to a region of the object mask 39 but does not correspond to the effective region of the depth value.

As illustrated in FIG. 7, in the image obtained by the left image camera 111 of FIG. 4 and the image obtained by the depth camera 120, the occlusion region is an occlusion region (shaded region) in which a depth value of a part 36 of a rear side object is not obtained in the depth value obtained by the depth camera 120 and when the region warps to the image plane of the left camera 111, the shaded region 40 of the image of the left camera 111 is a region in which depth information is not obtained from the depth camera 120. In this case, the shaded region 40 of the image of the left camera 111 is a region in which color information is not obtained due to an angle of view also in the left camera 112, so that information from which the depth value is estimated only has color information of the image of the left camera 111 so that it is difficult to estimate the depth value.

The exemplary embodiment of the present invention uses a method which spreads the value to the occlusion region using the depth value estimated at an edge of the object in order to estimate a depth of the object including the occlusion region 40 by calculating the occlusion region 40 in the object mask 39 as illustrated in FIG. 8 as described above.

To this end, the stereo matching unit 132 calculates an edge coordinate between objects of the image using the object mask 39 and the occlusion region 40 as described above and determines a depth value of the edge coordinate through stereo matching of a stereo image using depth image information (depth value) in 610.

The stereo matching unit 132, for example, calculates coordinates (see 30 positions of FIG. 9) of the pixels in the front side object immediately before the occlusion region 40 as an edge between the front side object and the rear side object starts, as the edge coordinates.

The stereo matching unit 132 warps a specific reference point (pixel) of one image among the stereo images of the cameras 111 and 112 to another image to perform the stereo matching which finds a pixel having the most similarity. In this case, the depth image information (depth value) from the depth camera 120 is reflected to determine pixels having the most similarity to be in the same position, thereby matching the two images. Further, the depth values (30 of FIG. 9) for the edge coordinate for the matched image(s) in this case may be determined from the depth image information (depth value) from the depth camera 120.

The depth information based stereo matching described above may use various methods, for example, a method which estimates a depth value using a difference of two images and further reflects depth image information from the depth camera 120 to determine the pixels having the most similarity to be in the same position and the techniques have been well known in the art, so that the detailed description will be omitted.

The spread correcting unit 133 performs depth value spread correction to an end (pixel) of the occlusion region 40 toward the occlusion region in the edge coordinate (see 30 positions of FIG. 9) as described above in 604 and 605.

Figure 9:
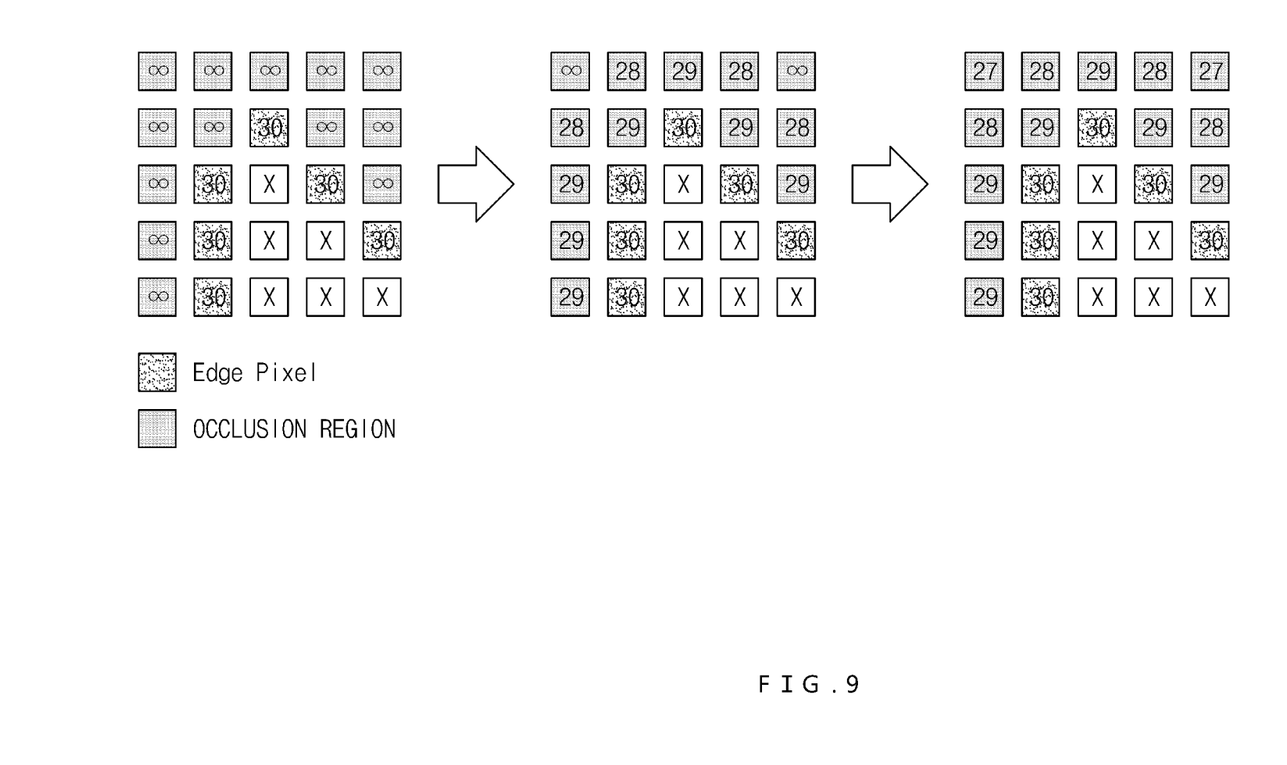
FIG. 9 is a view explaining a depth value spreading method according to an exemplary embodiment of the present invention.
Figure 10:
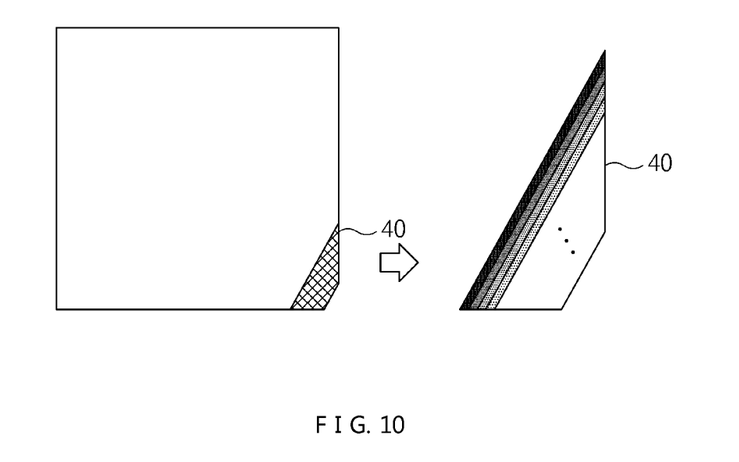
FIG. 10 is a view explaining a depth value correcting result for an occlusion region according to an exemplary embodiment of the present invention.

For example, as illustrated in FIG. 9, when the depth values for the edge coordinate are 30, a depth value (for example, not available/∞) of pixels which are the most adjacent to the edge is corrected to be 29 and a next adjacent pixel is corrected to be 28. The depth value is corrected to be reduced by a predetermined value (for example, 1) for every pixel unit in accordance with pixel proximity and as illustrated in FIG. 10, a process of correcting the depth value to the end (pixel) of the occlusion region 40 toward the occlusion region is repeated, so that a precise depth value for the occlusion region 40 may be obtained as illustrated in FIG. 10.

As described above, the spread correcting unit 133 obtains the precise depth value for the occlusion region 40 in the object mask 39 to generate a three-dimensional image having a depth value for the occlusion region 40 and when eye parts among objects obtained by the cameras 111 and 112 using the same are not contacted, that is, when a person stares toward the front side, but an image in which the person does not stare toward the front side is output through the screen of a remote attendance, an image (information) in which a view point is converted into the front to be eye-contacted, that is, telepresence data may be provided. Therefore, a more natural eye-contact function is provided, to improve a quality of a video conference.

Figure 11:
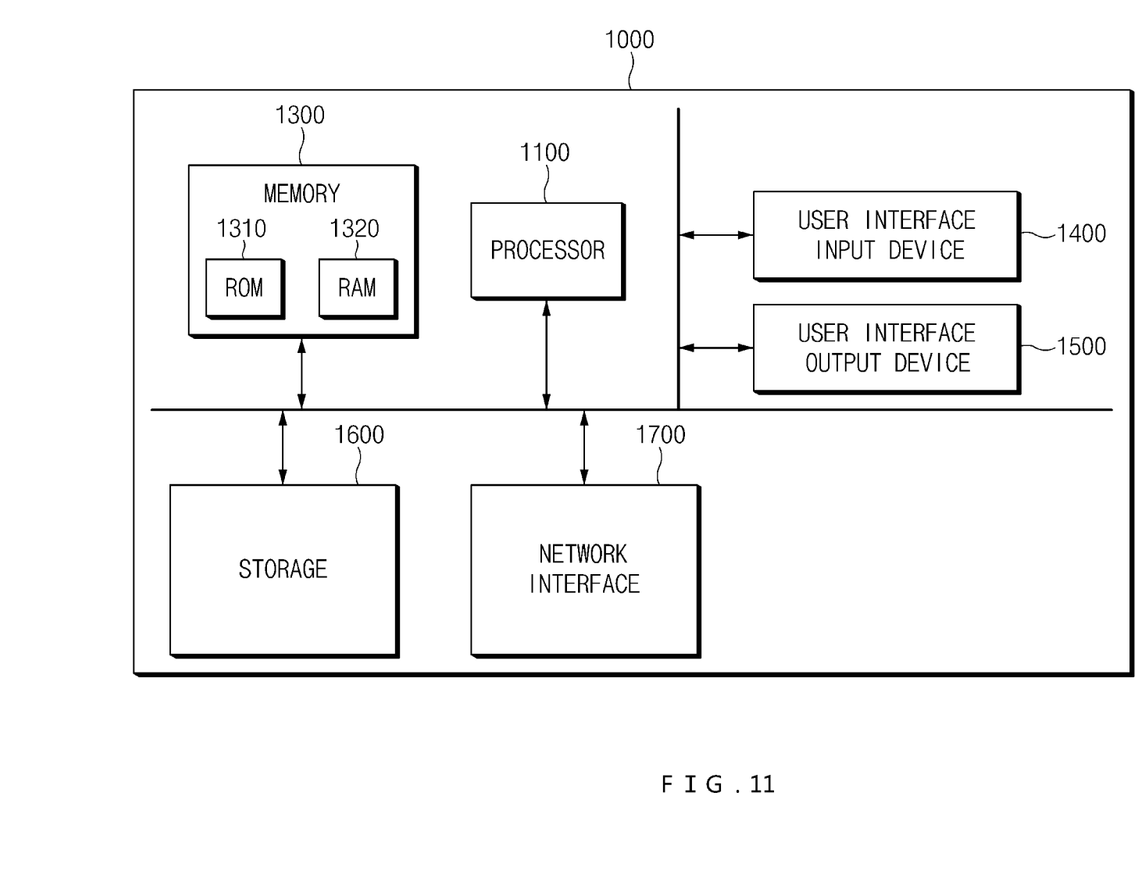
FIG. 11 is a view explaining an example of an implementing method of a video conference system according to an exemplary embodiment of the present invention.

FIG. 11 is a view explaining an example of an implementing method of a video conference system 100 according to an exemplary embodiment of the present invention. The video conference system 100 according to the exemplary embodiment of the present invention may be configured by hardware, software, or a combination thereof. For example, the video conference system 100 may be implemented by a computing system 1000 as illustrated in FIG. 11.

The computing system 1000 may include at least one processor 1100, a memory 1300, a user interface input device 1400, a user interface output device 1500, a storage 1600, and a network interface 1700 which are connected to each other through a bus 1200. The processor 1100 may be a semiconductor device which may perform processings on commands which are stored in a central processing unit (CPU), or the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

The method or a step of algorithm which has described regarding the exemplary embodiments disclosed in the specification may be directly implemented by hardware or a software module which is executed by a processor 1100 or a combination thereof. The software module may be stored in a storage medium (that is, the memory 1300 and/or the storage 1600) such as a RAM, a flash memory, a ROM, an EPROM, an EEPROM, a register, a hard disk, a detachable disk, or a CD-ROM. An exemplary storage medium is coupled to the processor 1100 and the processor 1100 may read information from the storage medium and write information in the storage medium. As another method, the storage medium may be integrated with the processor 1100. The processor and the storage medium may be stored in an application specific integrated circuit (ASIC). The ASIC may be stored in a user terminal As another method, the processor and the storage medium may be stored in a user terminal as individual components.

The specified matters and limited exemplary embodiments and drawings such as specific elements in the present invention have been disclosed for broader understanding of the present invention, but the present invention is not limited to the exemplary embodiments, and various modifications and changes are possible by those skilled in the art without departing from an essential characteristic of the present invention. Therefore, the spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

What is claimed is:

1. An image processing method in an apparatus which supports video conference, the method comprising:
generating an object mask for an image using stereo image information from a first camera and a second camera and depth image information from a depth camera and calculating an occlusion region in the object mask with respect to a depth;
calculating an edge coordinate between objects of the image using the object mask and the occlusion region and determining a depth value of the edge coordinate of the depth image information through stereo image matching using the depth image information; and
correcting such that there are depth values of the occlusion region to an end of the occlusion region toward the occlusion region in the edge coordinate.

2. The method of claim 1, wherein the image processing method is performed for eye-contact processing between a remote attendance and a local attendance in a video conference system.

3. The method of claim 1, wherein in the calculating of an occlusion region, an object part for each of the stereo images is extracted and an object part region for an image of the first camera at the left and the second camera at the right is generated as the object mask depending on whether a rear side object is positioned at a left or right in the image.

4. The method of claim 1, wherein in the calculating of an occlusion region, the depth image information is warped to an image plane to perform an exclusive OR function for the effective region of the warped depth value and the object mask, thereby calculating the occlusion region.

5. The method of claim 1, wherein the edge coordinate is an edge between a front object and a rear object and is coordinates of pixels of the front object before the start of the occlusion region.

6. The method of claim 1, wherein in the correcting, depth values for the occlusion region are corrected by a predetermined value for every pixel unit in accordance with pixel proximity.

7. The method of claim 1, further comprising:
after the correcting,
generating a three-dimensional image having depth values for the occlusion region to convert a view point such that an eye part of a person among objects of the image is contacted, thereby providing a corrected image.

8. An image processing apparatus which supports a video conference, the apparatus comprising:
an occlusion region calculating unit which generates an object mask for an image using stereo image information from a first camera and a second camera and depth image information from a depth camera and calculates an occlusion region in the object mask with respect to a depth;
a stereo matching unit which calculates an edge coordinate between objects of the image using the object mask and the occlusion region and determines a depth value of the edge coordinate of the depth image information through the stereo image matching using the depth image information; and
a spread correcting unit which corrects such that there are depth values of the occlusion region to an end of the occlusion region toward the occlusion region in the edge coordinate.

9. The apparatus of claim 8, wherein the image processing apparatus is for eye-contact processing between a remote attendance and a local attendance in a video conference system.

10. The apparatus of claim 8, wherein the occlusion region calculating unit extracts an object part for each of the stereo images and generates an object part region for an image of the first camera at the left and the second camera at the right as the object mask depending on whether a rear side object is positioned at a left or right in the image.

11. The apparatus of claim 8, wherein the occlusion region calculating unit warps the depth image information to an image plane to perform an exclusive OR for the effective region of the warped depth value and the object mask, thereby calculating the occlusion region.

12. The apparatus of claim 8, wherein the stereo matching unit calculates coordinates of pixels of the front object before the start of the occlusion region as the edge coordinate, as an edge between a front object and a rear object.

13. The apparatus of claim 8, wherein the spread correcting unit corrects depth values for the occlusion region by a predetermined value for every pixel unit in accordance with pixel proximity.

14. The apparatus of claim 8, wherein the spread correcting unit generates a three-dimensional image having depth values for the occlusion region to convert a view point such that an eye part of a person among objects of the image is contacted, thereby providing a corrected image.

* * * * *